(12) United States Patent
Zhang et al.

(10) Patent No.: US 12,066,886 B2
(45) Date of Patent: Aug. 20, 2024

(54) SERVICE STACK RECOVERY IN CLOUD PLATFORMS

(71) Applicant: SAP SE, Walldorf (DE)

(72) Inventors: Le Zhang, Xi'an (CN); Yu Wang, Xi'an (CN); Daping Wang, Xi'an (CN); Moritz Semler, Spechbach (DE)

(73) Assignee: SAP SE, Walldorf (DE)

( * ) Notice: Subject to any disclaimer, the term of this patent is extended or adjusted under 35 U.S.C. 154(b) by 60 days.

(21) Appl. No.: 17/986,030

(22) Filed: Nov. 14, 2022

(65) Prior Publication Data

US 2024/0160514 A1  May 16, 2024

(51) Int. Cl.
*G06F 11/07* (2006.01)

(52) U.S. Cl.
CPC ...... *G06F 11/0772* (2013.01); *G06F 11/0793* (2013.01)

(58) Field of Classification Search
CPC ................. G06F 11/0772; G06F 11/0793
USPC .......................................................... 714/48
See application file for complete search history.

(56) References Cited

U.S. PATENT DOCUMENTS

| | | | |
|---|---|---|---|
| 1,176,314 | A | 3/1916 | Poole |
| 10,237,118 | B2 | 3/2019 | Du et al. |
| 10,686,908 | B2 | 6/2020 | Du et al. |
| 10,997,208 | B2 | 5/2021 | Du et al. |
| 11,080,166 | B2 | 8/2021 | Du et al. |
| 11,403,320 | B2 | 8/2022 | Wang et al. |
| 11,422,973 | B2 | 8/2022 | Wang et al. |
| 2018/0121326 | A1 | 5/2018 | Qi et al. |
| 2018/0143856 | A1 | 5/2018 | Du et al. |
| 2020/0274946 | A1 | 8/2020 | Du et al. |
| 2020/0285610 | A1 | 9/2020 | Wang et al. |
| 2021/0263769 | A1 | 8/2021 | Du et al. |
| 2022/0253459 | A1 | 8/2022 | Wang et al. |
| 2022/0261280 | A1 | 8/2022 | Du et al. |
| 2022/0286465 | A1 | 9/2022 | Du et al. |

FOREIGN PATENT DOCUMENTS

WO    WO-2014158066 A1 * 10/2014 .......... G06F 11/0709

OTHER PUBLICATIONS

WO 2014158066 (Year: 2014).*
U.S. Appl. No. 17/557,147, Zhang et al., filed Dec. 21 2021.

* cited by examiner

*Primary Examiner* — Yair Leibovich
(74) *Attorney, Agent, or Firm* — Fish & Richardson P.C.

(57) ABSTRACT

Methods, systems, and computer-readable storage media for receiving, by a service stack recovery engine, an error message indicating a failed service in a plurality of services executed in a cloud platform, determining, by the service stack recovery engine, a set of services for recovery in response to the error message, and, for each service in the set of services, identifying, by the service stack recovery engine, an error handler that is associated with a service recovery type in a set of service recovery types, the error handler including a set of error handling operations to be executed to recover the failed service, and transmitting, by the service stack recovery engine, the error handler to a service recovery agent associated with the respective service, the service recovery agent executing error handling operations of the error handler to recover the service.

20 Claims, 3 Drawing Sheets

SERVICE STACK RECOVERY IN CLOUD PLATFORMS

BACKGROUND

Software systems can be provided in a so-called service-oriented architecture (SOA). For example, an application can be composed of a set of services in a service stack (e.g., a stack of services in which one or more services can each depend on one or more other services). In some examples, the services, which can also be referred to as micro-services, are reusable (e.g., multiple applications can include the same service). In cloud platforms, services can be deployed to clusters within a container orchestration system (e.g., Kubernetes).

It can occur, however, that a service encounters an error and is unable to execute its functionality. For example, a service can fail (e.g., crash) at set-up and/or runtime. In such instances, services along the service stack (e.g., services that depend on the failed service) and even the entire application, as a whole, can be impacted and be unable to perform required functionality. To mitigate this, service stack recovery approaches have been developed. However, traditional service stack recovery approaches are time- and resource-inefficient and can result in the cloud platform not meeting service level agreements (SLAs).

SUMMARY

Implementations of the present disclosure are directed to a service stack recovery platform to recover failed services in cloud platforms. More particularly, implementations of the present disclosure are directed to a service stack recovery platform that includes a service recovery engine and a set of service recovery agents distributed to services within a cloud platform.

In some implementations, actions include receiving, by a service stack recovery engine, an error message indicating a failed service in a plurality of services executed in a cloud platform, determining, by the service stack recovery engine, a set of services for recovery in response to the error message, and, for each service in the set of services, identifying, by the service stack recovery engine, an error handler that is associated with a service recovery type in a set of service recovery types, the error handler including a set of error handling operations to be executed to recover a respective service, and transmitting, by the service stack recovery engine, the error handler to a service recovery agent associated with the respective service, the service recovery agent executing error handling operations of the error handler to recover the respective service. Other implementations of this aspect include corresponding systems, apparatus, and computer programs, configured to perform the actions of the methods, encoded on computer storage devices.

These and other implementations can each optionally include one or more of the following features: actions further include receiving, by the service stack recovery engine and from each service recovery agent, a recovery status indicating a degree of completion of recovery for the respective service; actions further include, in response to determining that recovery of a first service in the set of services is complete, determining a recovery status of a second service in the set of services, and at least partially in response to the recovery status of the second service, transmitting, by the service stack recovery engine, instructions to halt recovery of the second service; recovery of the service is associated with a time to recover; each error handler is determined from an error handler registry based on a service identifier of the respective service and an error type; the set of service recovery types includes isolate and replace, freeze and reallocate, recycle and replace, and segment and rearrange; and the service recovery agent is executed on a service node that the respective service is executed on.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
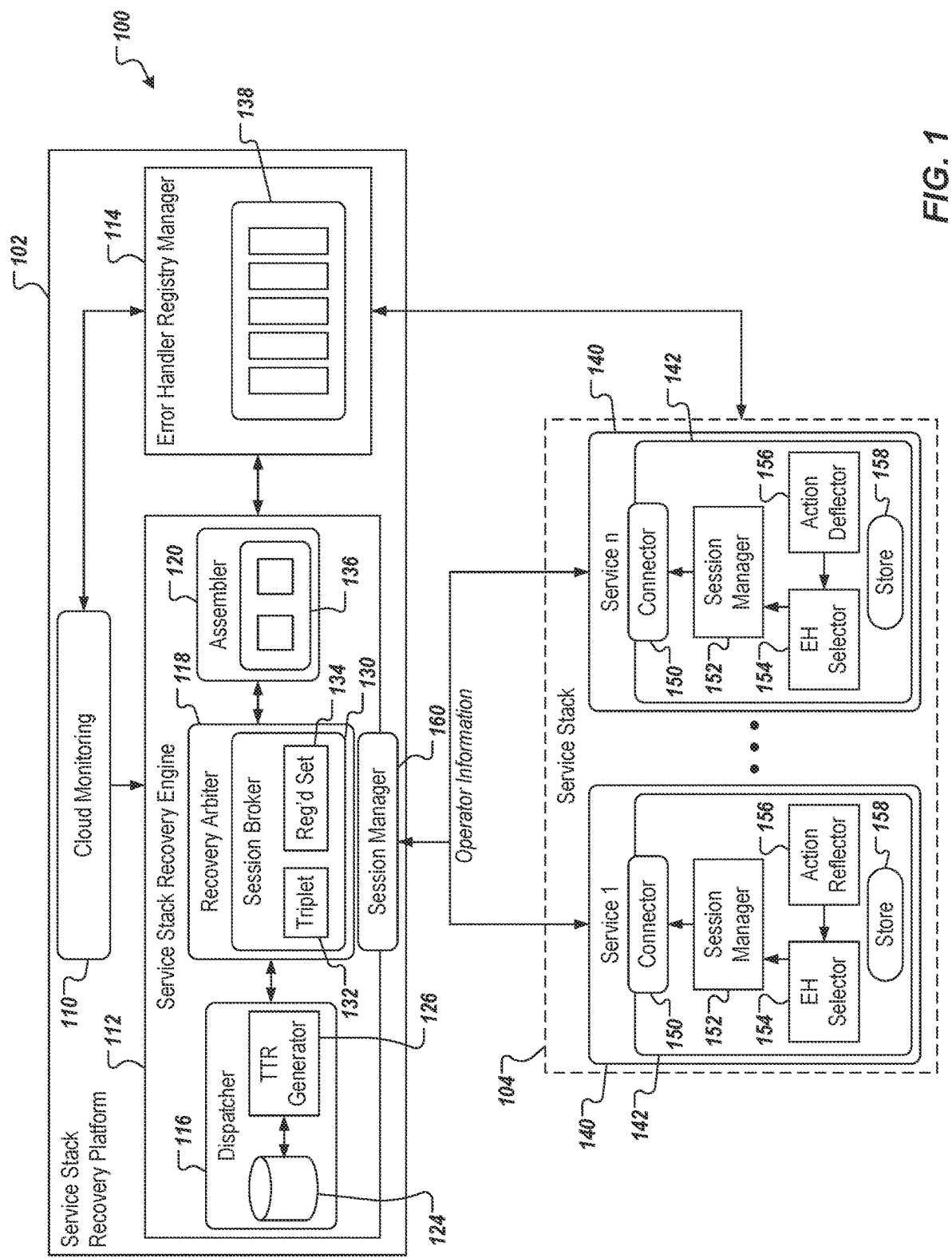
FIG. 1 depicts an example architecture that can be used to execute implementations of the present disclosure.

Implementations of the present disclosure are directed to a service stack recovery platform to recover failed services in cloud platforms. More particularly, implementations of the present disclosure are directed to a service stack recovery platform that includes a service recovery engine and a set of service recovery agents distributed to services within a cloud platform. As described in further detail herein, for a service that has failed, the service recovery engine coordinates recovery of the service with a service recovery agent that is provided for the service to enable time- and resource-efficient recovery of the service.

Implementations can include actions of receiving, by a service stack recovery engine, an error message indicating a failed service in a plurality of services executed in a cloud platform, determining, by the service stack recovery engine, a set of services for recovery in response to the error message, and, for each service in the set of services, identifying, by the service stack recovery engine, an error handler that is associated with a service recovery type in a set of service recovery types, the error handler including a set of error handling operations to be executed to recover a respective service, and transmitting, by the service stack recovery engine, the error handler to a service recovery agent associated with the respective service, the service recovery agent executing error handling operations of the error handler to recover the respective service.

To provide further context for implementations of the present disclosure, and as introduced above, software systems can be provided in a so-called service-oriented architecture (SOA). For example, an application can be composed of or otherwise rely on a set of services in a service stack (e.g., a stack of services in which one or more services can each depend on one or more other services). A service can be provided as one or more computer-executable programs. In some examples, the services, which can also be referred to as micro-services, are reusable (e.g., multiple applications can include the same service). In cloud platforms, services can be deployed to clusters within a container orchestration system (e.g., Kubernetes). In some examples, multiple instances of a service can be provided within a cluster and/or across multiple clusters.

It can occur, however, that a service encounters an error and is unable to execute its functionality. For example, a service can fail (e.g., crash) at set-up and/or runtime. In such instances, services along the service stack (e.g., services that depend on the failed service) and even the entire application, as a whole, can be impacted and be unable to perform required functionality. To mitigate this, service stack recovery approaches have been developed.

However, traditional service stack recovery approaches lack overall control of individual services and/or a related recovery topology when specific services fail. Consequently, an orchestration and scheduling service needs to be halted or aborted due to failed services. In some instances, traditional service stack recovery approaches use manual operations that are handled by related service stakeholders. Further, a lack of common error-handling operation knowledge and automatic operation routines can result in the orchestration and scheduling service aborting a service provisioning process or retrying the overall process. This results in unnecessary consumption of cloud resources (e.g., processors, memory). Accordingly, in traditional service stack recovery approaches, the overall provisioning workflow does not have the flexible capacity with cluster intelligence to automatically recover the failed service. Furthermore, the orchestration and scheduling service requires self-healing and robust capability when facing diverse but coordinated services during runtime. Overall, traditional service stack recovery approaches are time- and resource-inefficient, which not only results in resources (e.g., processors, memory) being wasted, but can result in the cloud platform not meeting service level agreements (SLAs).

In view of the above context, implementations of the present disclosure provide a service stack recovery platform to recover failed services in cloud platforms. As described in further detail herein, the service stack recovery platform includes a service recovery engine and a set of service recovery agents distributed to services within a cloud platform. For a service that has failed, the service recovery engine coordinates recovery of the service with a service recovery agent that is provided for the service to enable time- and resource-efficient recovery of the service.

In some implementations, the service stack recovery platform of the present disclosure collects, generates, and registers error handling operators for each service when a failure occurs. In some examples, an error handler is dispatched from a central service recovery arbiter applies the components and features to invoke one or more other error handlers under each service recovery agent running on failed service nodes. In this manner, orchestration and scheduling services are able to better control a service recovery workflow and the time and cost (in terms of technical resources expended) of the cluster self-healing process are reduced.

As described in further detail herein, the service stack recovery platform of the present disclosure provides the features and capability to attentively manage errors occurring in services and recover failed services. In some examples, a service can be recovered to a specified SLA level. In some implementations, orchestration and scheduling self-control capability is provided for services that have failed. In some examples, a self-healing capability is provided for clusters and related landscapes. In some implementations, the service stack recovery platform of the present disclosure enables the orchestration and scheduling service to have the necessary knowledge and status reporting on which level the services recoveries are completed. This multi-level of recovery for the failed services can include expected status, isolation and replace, frozen and reallocation, recycle and replace, segmentation and rearrangement. This multi-level combination on the expectation status of multi-level recovery is designed based on different service recovery mechanisms and related innovative approaches. As described herein, implementations of the present disclosure provide orchestration and scheduling management that automatically manipulates error-handling operations for failed services with pre-defined SLA level and acceptable cluster self-healing capability.

Implementations of the present disclosure are described in further detail herein with reference to an example cloud platform. The example cloud platform includes SAP HANA Cloud, provided by SAP SE of Walldorf, Germany. SAP HANA Cloud can be described as a database as a service (DBaaS) foundation for modern applications and analytics across enterprise data. It is contemplated, however, that implementations of the present disclosure can be realized with any appropriate cloud platform.

FIG. 1 depicts an example architecture 100 in accordance with implementations of the present disclosure. In the depicted example, the example architecture 100 includes a service stack recovery platform 102 and a service stack 104. In some examples, the service stack recovery platform 102 and the service stack 104 are provisioned within a cloud platform (e.g., SAP HANA Cloud). Although not depicted in FIG. 1, a central orchestration and scheduling service is provided (e.g., in a core cluster of the cloud platform) and is used to organize services into stack when customers request and consume the services. In some implementations, the central orchestration and scheduling service invoke the service stack recovery platform 102 for monitoring services and notifying the corresponding service failure or cloud resource provisioning error.

In some implementations, the cloud platform 102 includes a cloud monitoring component 110, a service stack recovery engine 112, and an error handler registry manager 114. The service stack recovery engine 112 includes a dispatcher 116, a recovery arbiter 118, and an assembler 120. The dispatcher 116 is also referred to as an elastic multi-level time-to-recover (TTR) dispatcher, the recovery arbiter 118 is also referred to as a service stack recovery arbiter, and the assembler 120 is also referred to as an error-wiped operator assembler. In the example of FIG. 1, the dispatcher 116 includes a service field repository 124 and a TTR generator 126, the recovery arbiter 118 includes a session broker 130 having a recovery session triplet 132 and an operator registered set 134, and the assembler includes an operation selector 136. The error handler registry manager 114 includes an error handler registry 138.

In general, the service stack recovery engine 112 provides error handlers to recover failed services within service stacks, such as the service stack 140. As described in further detail herein, the service stack recovery engine 112 provides a central orchestration and scheduling service the capacity to actively manage cluster health and recovery control. For example, instead of waiting for an autonomous service to retrieve information about the status of a failed service, the central orchestration and scheduling service can coordinate the covering services from recovery operations. As described herein, the service stack recovery engine 112 enables a self-healing capability under scalable and flexible cloud environments.

In the example of FIG. 1, the service stack 104 represents a set of services 140 (e.g., 1, ..., n services, where n>2) that operate in conjunction with one another. In some examples, each service 140 is executed in a respective service node within a cluster of a cloud platform. Within a service stack, a first service can depend on a second service. For example, the first service issues a request to the second service, the second service provides a response to the first service, and the first service performs some functionality using the response (e.g., data within the response). In this example, the first service depends on the second service.

In accordance with implementations of the present disclosure, each service 140 includes a service recovery agent 142. In some examples, each service recovery agent 142 is provisioned on the service node of the respective service 140. In the example of FIG. 1, each service recovery agent 142 includes a connector 150, a session manager 152, an error handler (EH) selector 154, an action reflector 156 (also referred to as a policy-based action reflector), and a data store 158. In some examples, the data store 158 stores a retry policy map and an operation stack set. In some examples, the service stack recovery engine 112 communicates with the service recovery agents 142 through a session manager 160 and the respective connectors 150.

In some implementations, the error handler registry manager 114 generates, stores, and manages error handlers, each error handler having an invoking interface. In some examples, the error handler registry manager 114 generates an error handler using an error-type-defined code logic template and defined interface to populate the template, consuming an uploaded executor implementation which is provided by a specified service owner of the respective service (e.g., developer of the service). In some examples, the metadata related to an error handler is composed of error-type identifier, an error mapping data to service dependency graph, and a failure handling reference index. Information related to registry management is also included, which records the service owner information, upload scheme content, update refresh data, and the like.

In some examples, the error handlers and related metadata are updated by each service owner. In some examples, the service owner, according to a service development and delivery plan, has the responsibility to provide the service itself as well as updating error handlers to the error handler registry 138. If internal test and validation pass, the error handler registry 138 will receive the uploaded error handlers with descriptions and notify the service owner that the standard error handlers are accepted. After one or more cycles of service integration quality assurance processes, the failure/error reporting is used to help the service stack recovery platform 102 generate the an error handler update plan, which contains detailed information on whether to update and expand the error handler due to a severity of a current service stack.

In some examples, error handler metadata is defined and maintained using service description management (e.g., SAP HANA Cloud service description management). In some examples, a sub-set of a service description set (e.g., SAP HANA Cloud service description set) can be provided for error handling messaging and invocation. For example, the error handler registry 138 receives and updates error handler information from respective service owners based on a rollout plan and version-controlled mechanism.

In some implementations, the dispatcher 116 generates and manages a time-to-recover (TTR) that is sent to service recovery agents. In some examples, each TTR is constructed and defined based on a respective service. For example, a TTR is determined based on, for a respective service, a service importance, a service sensitivity, error criticality, and an overall workflow requirement. In some examples, the TTR is determined by combining a pre-defined level of service importance, service sensitiveness, error criticality, overall workflow requirement, and grading evaluation on overall resource provisioning and request handling capability of runtime context. Thus, the TTR is constructed in the designed information structure which could be consumed by the time-sensitive threshold manipulation and real-time base of effectiveness on recovery evaluation. In some examples, the dispatcher 116 provides the TTR to an error handler. During error handling, the TTR is used for a countdown mode to enable the orchestration and scheduling services to evaluate the timeline and effectiveness of service recovery.

In some implementations, the recovery arbiter 118 evaluates the effectiveness and impact of service recovery at different levels and completion status. For example, the orchestration and scheduling service receives recovery data that indicates a level of recovery that has been achieved for a failed service. The recovery arbiter 118 has well-defined communication interface to the orchestration and scheduling services when required error handling and recovery data are needed. In some examples, the recovery data can be used to evaluate the completeness of error handling operations and recovery process of each failed service. In this manner, capabilities of self-healing and robustness of orchestration and scheduling services within clusters and landscapes can be completed. In some examples, the session broker 134 holds the session management and related meta information for each failed service under a recovery process. The session broker 134 has the functionality to send the proper error handler (e.g., with set of error handling operations that are to be executed) to the respective service recovery agent 142 for recovery execution. In some examples, the session broker 134 receives error handling or recovery operation status from each service recovery agent 142.

In some implementations, the assembler 120 generates executable error handling operations that are pushed to the service recovery agents 142. The assembler 120 generates error handling operations with proper invoking methods from the error handler registry 138.

The error handler registry manager 114 generates the error handlers which only contain the error-type-mapped recovery code template which generically manipulate the error-oriented recovery code logic. However, it needs to be further packed with runtime related information, resource aware metadata and distributed agent-specific provisions. The assembler 120 generates the error handler operators which represented the completed form. For example, and as discussed above, the error handler registry manager 114 generates error handlers that include only an error-type-mapped recovery code template that generically manipulates error-oriented recovery code logic. However, the assembler 120 populates the template with runtime related information, resource-aware metadata, and provisions specific to service recovery agents 142. That is, the assembler 120 populates the templates to provide respective error handler operators, which are available for dispatch to the service recovery agents 142 when service-error or failure with recovery process required. In some implementations, each error handler operator is wrapped with a service error-type tag, a service error-briefing message, and an error-handling invoking interface signature.

In some implementations, each service recovery agent 142 receives and executes an error handler for a specified failed situation within the respective service. The completed result of error handling and recovery status is uploaded from each service recovery agent. In general, each service recovery agent 142 is invoked by the recovery arbiter 118 and executes an error handler that is provisioned from the service stack recovery engine 112. In some examples, each service recovery agent 142 sends retry status and related information to the recovery arbiter 112 during execution of recovery. This process is controlled by the TTR allocated by the dispatcher 116.

In some examples, a TTR provided from the dispatcher 116 is used at various levels of service importance, service sensitiveness, error criticality, and overall workflow requirement. For example, when a policy-defined recovery process is invoked, a specified TTR is extracted with distinct information, such as a service importance grade, a pre-defined error criticality level, and a real-time calculation of time limitation in terms of factors from service extension and SLA policy. When the ongoing recovery process reaches the TTR defined threshold, the related arbiter performs the relevant execution plan to generate the recovery reporting and a service recovery agent takes the cleanup work afterwards.

In some implementations, the service recovery agents 142 are only invoked when a specific error occurs in services that are registered for recovery in the error handler registry 138. For example, and as described in further detail herein, a service 140 can be registered within the error handler registry 138 in a record that includes a service identifier (uniquely identifying the service 140 among all services 140), expected error messages for the service, and, for each error message, a service recovery type. If an error occurs in a service 140, the service identifier of the service 140 is used as an index to determine whether the service 140 is registered. If the service 140 is registered, an error message received for the service 140 is used as an index to the expected error messages to determine a service recovery type that is to be performed to recover the service 140. In some examples, the session manager 152 functions as an error handling operation incubator which provides a running environment for recovery of the service 140. In some examples, error handler selector 154 generates metadata information for local service recovery execution. In some examples, the metadata information is used for correctly leveraging error handler executor in a local environment. The metadata information is the combined data structure with specified methods including distributed configuration plan, system related resource map, and a runtime evaluation policy index.

In some examples, the action reflector 156 maps error handler code logic to relevant runtime checkpoints. The action reflector 156 constructs a mapping from error handler logic to relevant runtime checkpoints in order to instantly collect critical degree of failure issues and timely evaluate the recovery level of the targeted service stack. The checkpoints are configured locations within a specified service linking graph, which are populated into the runtime service stack for ease of failure severity level and recovery evaluation processes. In some examples, the action reflector 156 can access the retry policy map and the operation stack set stored in the store 158.

In accordance with implementations of the present disclosure, the service stack recovery platform (e.g., the service stack recovery platform 102 in conjunction with respective service recovery agents 142 of FIG. 1) of the present disclosure enables automatic recovery of a service in event of a failure. In some examples, multiple service recovery types are supported. Example service recovery types can include, without limitation, isolate and replace, freeze and reallocate, recycle and replace, and segment and rearrange. For example, and with respect to isolate and replace, a service can encounter a failure due to insufficient resources. In such an event, the service can be isolated within a cluster (e.g., when isolated, the service is no longer available to process requests) and can be replaced by another instance of the service within the cluster. With respect to freeze and reallocate, when a service with resource consumption limitation (e.g., time-sensitive context) needs to invoke another service through a service gateway, freeze and reallocate is used. For example, the service is blocked and rescheduled and is migrated to a waiting queue, freezing its execution life cycle, waiting for the next time-slice to consume for retry on a service request. Following that, when required and dependent service or service list could be available through gateway permission, the service could be fed and reallocated to another service node to take service request. With respect to recycle and replace, a service (e.g., storage monitor service) can be destroyed and recycled (e.g., to a dustbin), and a configuration file can be used to replace the service in the cluster. With respect to segment and rearrange, when a service is composed of multiple other services that do not function in specific situations (e.g., due to an underlying service dependency graph not representing a correct service invocation chain), the segment and rearrange approach will be performed. In some examples, the service invocation chain is revoked, the original service capability plan is retrieved, and the defined and correct service dependency metadata is retrieved. The service invocation chain is reconstructed chain to wrap and regenerate the failed service with expectation to let the service work well again.

In some implementations, for each service recovery type (e.g., isolate and replace, freeze and reallocate, recycle and replace, segment and rearrange) a set of error handling operations is defined. In some examples, an error handler executes the operations in the set of error handling operations (e.g., as an error recovery workflow) to perform a respective service recovery type. In some examples, each error handler is specific to a service recovery type. In some examples, an assembler (e.g., the assembler 120) provides the set of error handling operations for the respective service recovery types. That is, the assembler assembles operations into the set of error handling operations.

In some implementations, each service executing in the cloud platform within a service stack (e.g., the services 140) registers expected error messages with related retry policy-based handlers to the error handler registry (e.g., the error handler registry 138). In some examples, a retry policy defines parameters to retry recovery of a respective service (e.g., number of times to retry, timeout for a retry). In some examples, when a provider of a service (service owner) makes the service available for execution within the cloud platform, the service owner registers the expected error messages with the error handler registry. In some examples, the expected error messages include error messages that the service can issue in the event of a failure, each error message corresponding to a respective error type. Example error types can include, without limitation, permission failure (e.g. permission not granted), role failure (e.g., role is of insufficient level to execute), lack of resources (e.g., insufficient processors, memory), resource shortage from concurrent access and requests, role and access policy anti-pattern manipulation, workload coordination mis-scheduling, service dependency generation and mapping mismatch, and service provisioning process abort. In some examples, the service stack recovery platform (e.g., the cloud monitoring component 110) receives an error message in the event that a service fails. In some examples, the error message includes error data indicating the service that failed and an error type.

In some implementations, error messages are stored in one or more error logs. Data within the error log can be analyzed in real-time or near real-time with respect to lineage and topology of the service stack. In some examples, lineage can refer to a chain of dependencies between services and topology can refer to where respective services are executed (e.g., which clusters, nodes within clusters). In accordance with implementations of the present disclosure, an error in a service can be a result of errors in one or more services that the service depends on. For example, and without limitation, a first service (e.g., a database instance) can depend on a set of services. In response to a first error message associated with the first service, error messages can be analyzed to identify the set of services that the first service depends on (e.g., lineage) and where each of the services in the set of services is provisioned (e.g., topology). In some examples, any error messages associated with services in the set of services can be identified. For example, in response to the error message associated with the first service, a second error message associated with a second service and a third error message associated with a third service can be determined from the error log, the first service being dependent on the second service and the third service (e.g., as determined from the lineage).

In some implementations, a service recovery type is determined for each service that is associated with an error message. Continuing with the example above, a service recovery type can be determined for the second service and a service recovery type can be determined for the third service. In some examples, the service recovery types can be different. For example, the service recovery type for the second service can be different from the service recovery type for the third service. In some implementations, the service recovery type for a service is determined from the error handler registry. For example, and as described herein, each service recorded in the error handler registry can be associated with a respective service recovery type (e.g., as defined by the respective service owner).

Continuing with the example above, it can be determined that the first error message of the first service was a result of the error in the second service and/or the error in the third service. Consequently, a first error handler can be dispatched to the second service and a second error handler can be dispatched to the third service. An error handler need not be dispatched to the first service because, in this example, the error in the first service is caused by the error in the second service and/or the error in the third service.

In accordance with implementations of the present disclosure, the error handler registry manager maintains and provides the error handlers in response to occurrence of errors. In some implementations, in response to occurrence of an error in a service, an error handler is identified within the error handler registry based on the service (e.g., an identifier that uniquely identifies the service) and the error type, and the error handler is provided to an orchestration and scheduling service. As a result, the orchestration and scheduling service is informed on how to retry the failed service with correct recovery policy (e.g., the recovery policy defined in the error handler registry for the respective service).

In some implementations, the arbiter receives a recovery status for each service. For any service that is determined to be recovered, the arbiter can determine whether there are any related services to be recovered and, for each related service, whether the related service has also been recovered. In some examples, the arbiter provides reporting on the overall health status of services and/or clusters (e.g., services that have failed and/or been recovered in which cluster(s)).

In some implementations, the arbiter can halt and rollback recovery of a service. For example, in a scenario, in which multiple services are to be recovered, the arbiter can determine that, because one or more of the services has been recovered, on-going recovery of one or more of the other services is unnecessary. Consequently, the arbiter can issue instructions (e.g., to a respective service recovery agent) to halt and rollback recovery of the one or more other services. For example, and with continued reference to the example above, it can be determined that the error in the first service is a result of the error in the second service and the error in the third service. In this example, recovering the second service or the third service will resolve the error in the first service. Continuing with this example, the arbiter can receive a recovery status for the second service indicating that the second service has been recovered and a recovery status for the third service indicating that recovery is on-going. In response, the arbiter can issue instructions to halt and rollback recovery operations (error handling operations) that have been executed to recover the third service. In this manner, time and technical resources are conserved by not continuing with recovery of the third service.

Figure 2:
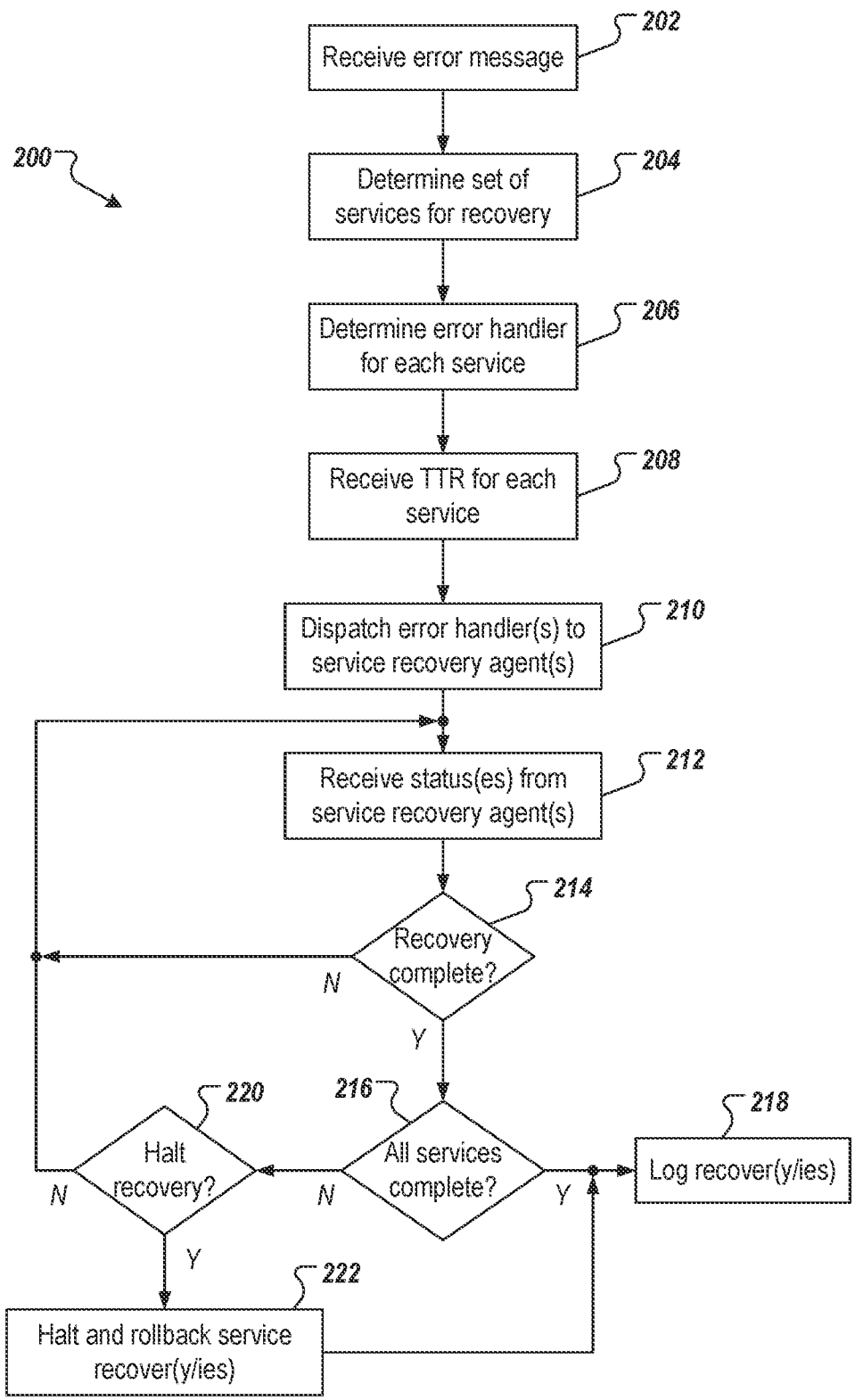
FIG. 2 depicts an example process that can be executed in accordance with implementations of the present disclosure.

FIG. 2 depicts an example process 200 that can be executed in accordance with implementations of the present disclosure. In some examples, the example process 200 is provided using one or more computer-executable programs executed by one or more computing devices.

An error message is received (202). For example, and as described herein, the service stack recovery platform (e.g., the cloud monitoring component 110) receives an error message in the event that a service fails. In some examples, the error message includes error data indicating the service that failed and an error type. A set of services for recovery is determined (204). For example, and as described herein, error messages are stored in one or more error logs and data within the error log can be analyzed in real-time or near real-time with respect to lineage and topology of the service stack. In some examples, an error in a service can be a result of errors in one or more services that the service depends on. In some examples, any error messages associated with services in the set of services can be identified. For example, in response to the error message associated with a first service, a second error message associated with a second service and a third error message associated with a third service can be determined from the error log, the first service being dependent on the second service and the third service (e.g., as determined from the lineage).

An error handler is determined for each service in the set of services (206). For example, and as described herein, a service recovery type is determined for each service that is associated with an error message, and an error handler can be provided (e.g., the error handler registry provide a template and the assembler 120 populates the template), the error handler being specific to the service and the service recovery type. A TTR is received for each service in the set of services (208). For example, and as described herein, a TTR is provided (e.g., from the dispatcher 116) and is based on one or more of service importance, service sensitiveness, error criticality, overall workflow requirement, and grading evaluation on overall resource provisioning and request handling capability of runtime context. In some examples, the TTR represents a time threshold for service recovery. For example, if a service is not recovered by the TTR, an alert can be issued for manual intervention in recovery of the service. Error handlers are dispatched to one or more service recovery agents (212).

It is determined whether a service in the set of services has been recovered (214). For example, and as described herein, a recovery status for each service is received (e.g., by the recovery arbiter 118). For any service that is determined to be recovered, the arbiter can determine whether there are any related services to be recovered and, for each related service, whether the related service has also been recovered. If a service in the set of services has not been recovered, the example process 200 loops back. If a service in the set of services has been recovered, it is determined whether all services have been recovered (216). If all services have been recovered, the recoveries are logged (218). If all services have not been recovered, it is determined whether recovery can be halted (220). For example, and as described herein, in a scenario, in which multiple services are to be recovered, the arbiter can determine that, because one or more of the services has been recovered, on-going recovery of one or more of the other services is unnecessary. If recovery cannot be halted, the example process 200 loops back. If recovery can be halted, at least one service recovery is halted and is rolled back (222). For example, and as described herein, instructions can be issued (e.g., by the recovery arbiter 118 to a respective service recovery agent 142) to halt and rollback recovery of the one or more other services.

Figure 3:
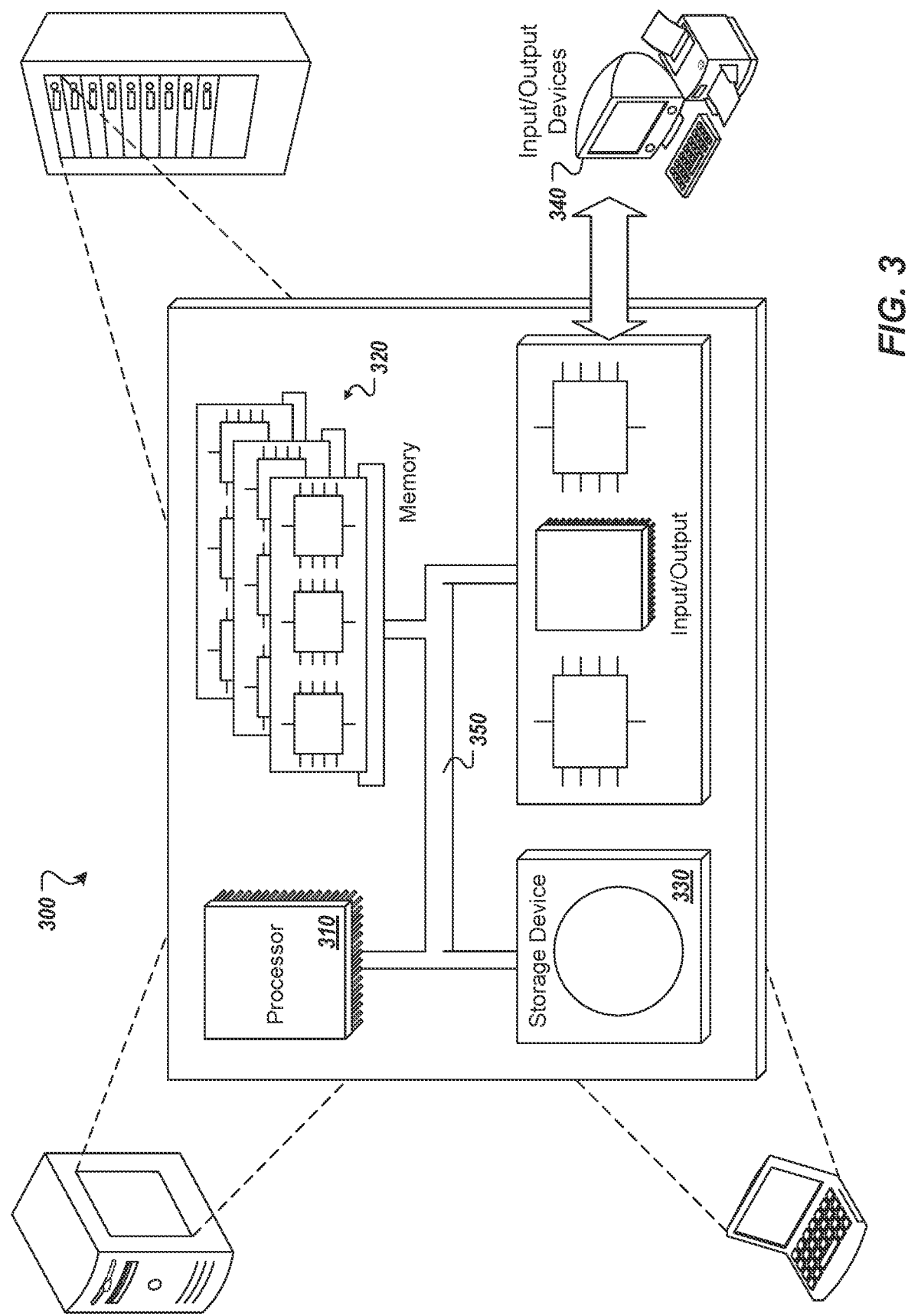
FIG. 3 is a schematic illustration of example computer systems that can be used to execute implementations of the present disclosure.

Referring now to FIG. 3, a schematic diagram of an example computing system 300 is provided. The system 300 can be used for the operations described in association with the implementations described herein. For example, the system 300 may be included in any or all of the server components discussed herein. The system 300 includes a processor 310, a memory 320, a storage device 330, and an input/output device 340. The components 310, 320, 330, 340 are interconnected using a system bus 350. The processor 310 is capable of processing instructions for execution within the system 300. In some implementations, the processor 310 is a single-threaded processor. In some implementations, the processor 310 is a multi-threaded processor. The processor 310 is capable of processing instructions stored in the memory 320 or on the storage device 330 to display graphical information for a user interface on the input/output device 340.

The memory 320 stores information within the system 300. In some implementations, the memory 320 is a computer-readable medium. In some implementations, the memory 320 is a volatile memory unit. In some implementations, the memory 320 is a non-volatile memory unit. The storage device 330 is capable of providing mass storage for the system 300. In some implementations, the storage device 330 is a computer-readable medium. In some implementations, the storage device 330 may be a floppy disk device, a hard disk device, an optical disk device, or a tape device. The input/output device 340 provides input/output operations for the system 300. In some implementations, the input/output device 340 includes a keyboard and/or pointing device. In some implementations, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for service stack recovery in cloud platforms, the method being executed by one or more processors and comprising:
    receiving, by a service stack recovery engine, an error message indicating a failed service in a plurality of services executed in a cloud platform;
    determining, by the service stack recovery engine, a set of services for recovery in response to the error message; and
    for each service in the set of services:
        identifying, by the service stack recovery engine, an error handler that is associated with a service recovery type in a set of service recovery types, the error handler comprising a set of error handling operations to be executed to recover a respective service, and
        transmitting, by the service stack recovery engine, the error handler to a service recovery agent associated with the respective service, the service recovery agent executing error handling operations of the error handler to recover the respective service.

2. The method of claim 1, further comprising receiving, by the service stack recovery engine and from a service recovery agent associated with the respective service, a recovery status indicating a degree of completion of recovery for the respective service.

3. The method of claim 2, further comprising:
    in response to determining that recovery of a first service in the set of services is complete, determining a recovery status of a second service in the set of services, and
    at least partially in response to the recovery status of the second service, transmitting, by the service stack recovery engine, instructions to halt recovery of the second service.

4. The method of claim 1, wherein recovery of the service is associated with a time to recover.

5. The method of claim 1, wherein the error handler is determined from an error handler registry based on a service identifier of the respective service and an error type.

6. The method of claim 1, wherein the set of service recovery types comprises isolate and replace, freeze and reallocate, recycle and replace, and segment and rearrange.

7. The method of claim 1, wherein the service recovery agent is executed on a service node that the respective service is executed on.

8. A non-transitory computer-readable storage medium coupled to one or more processors and having instructions stored thereon which, when executed by the one or more processors, cause the one or more processors to perform operations for service stack recovery in cloud platforms, the operations comprising:
    receiving, by a service stack recovery engine, an error message indicating a failed service in a plurality of services executed in a cloud platform;
    determining, by the service stack recovery engine, a set of services for recovery in response to the error message; and
    for each service in the set of services:
        identifying, by the service stack recovery engine, an error handler that is associated with a service recovery type in a set of service recovery types, the error handler comprising a set of error handling operations to be executed to recover a respective service, and
        transmitting, by the service stack recovery engine, the error handler to a service recovery agent associated with the respective service, the service recovery agent executing error handling operations of the error handler to recover the respective service.

9. The non-transitory computer-readable storage medium of claim 8, wherein operations further comprise receiving, by the service stack recovery engine and from a service recovery agent associated with its respective service, a recovery status indicating a degree of completion of recovery for the respective service.

10. The non-transitory computer-readable storage medium of claim 9, wherein operations further comprise:
    in response to determining that recovery of a first service in the set of services is complete, determining a recovery status of a second service in the set of services, and
    at least partially in response to the recovery status of the second service, transmitting, by the service stack recovery engine, instructions to halt recovery of the second service.

11. The non-transitory computer-readable storage medium of claim 8, wherein recovery of the service is associated with a time to recover.

12. The non-transitory computer-readable storage medium of claim 8, wherein the error handler is determined from an error handler registry based on a service identifier of the respective service and an error type.

13. The non-transitory computer-readable storage medium of claim 8, wherein the set of service recovery types comprises isolate and replace, freeze and reallocate, recycle and replace, and segment and rearrange.

14. The non-transitory computer-readable storage medium of claim 8, wherein the service recovery agent is executed on a service node that the respective service is executed on.

15. A system, comprising:
    a hardware-based computing device; and
    a non-transitory computer-readable storage device coupled to the computing device and having instructions stored thereon which, when executed by the computing device, cause the computing device to perform operations for natural language explanations for service stack recovery in cloud platforms, the operations comprising:

receiving, by a service stack recovery engine, an error message indicating a failed service in a plurality of services executed in a cloud platform;

determining, by the service stack recovery engine, a set of services for recovery in response to the error message; and for each service in the set of services:
- identifying, by the service stack recovery engine, an error handler that is associated with a service recovery type in a set of service recovery types, the error handler comprising a set of error handling operations to be executed to recover a respective service, and
- transmitting, by the service stack recovery engine, the error handler to a service recovery agent associated with the respective service, the service recovery agent executing error handling operations of the error handler to recover the respective service.

16. The system of claim 15, wherein operations further comprise receiving, by the service stack recovery engine and from a service recovery agent associated with its respective service, a recovery status indicating a degree of completion of recovery for the respective service.

17. The system of claim 16, wherein operations further comprise:
- in response to determining that recovery of a first service in the set of services is complete, determining a recovery status of a second service in the set of services, and
- at least partially in response to the recovery status of the second service, transmitting, by the service stack recovery engine, instructions to halt recovery of the second service.

18. The system of claim 15, wherein recovery of the service is associated with a time to recover.

19. The system of claim 15, wherein the error handler is determined from an error handler registry based on a service identifier of the respective service and an error type.

20. The system of claim 15, wherein the set of service recovery types comprises isolate and replace, freeze and reallocate, recycle and replace, and segment and rearrange.

* * * * *